US011332053B2

United States Patent
Longatte et al.

(10) Patent No.: US 11,332,053 B2
(45) Date of Patent: May 17, 2022

(54) SEAT SUSPENSION WITH OVERMOLDED FAN GRILLE

(71) Applicant: FAURECIA Sièges d'Automobile, Nanterre (FR)

(72) Inventors: Florent Longatte, Rambouillet (FR); Sébastien Lecroisey, Montigny le Bretonneux (FR); Dominique Cottin, Chilleurs aux Bois (FR); David Muhvic, Suresnes (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 16 days.

(21) Appl. No.: 16/856,324

(22) Filed: Apr. 23, 2020

(65) Prior Publication Data

US 2020/0339018 A1    Oct. 29, 2020

(30) Foreign Application Priority Data

Apr. 26, 2019 (FR) ...................................... 19 04482

(51) Int. Cl.
*B60N 2/56* (2006.01)
*B60N 2/50* (2006.01)

(52) U.S. Cl.
CPC .......... *B60N 2/5657* (2013.01); *B60N 2/502* (2013.01)

(58) Field of Classification Search
CPC ............................. B60N 2/502; B60N 2/5657
See application file for complete search history.

(56) References Cited

U.S. PATENT DOCUMENTS

2018/0065529 A1* 3/2018 Line .......................... B60N 2/62
2018/0070731 A1* 3/2018 Jibiki ................... B60N 2/5657

FOREIGN PATENT DOCUMENTS

| FR | 3036336 A1 | 11/2016 |
| FR | 3069816 A1 | 2/2019 |
| FR | 3069817 A1 | 2/2019 |

OTHER PUBLICATIONS

French Search Report for FR1904482 dated Feb. 20, 2020, BET200051, 8 pages, (No English Translation Available).

* cited by examiner

*Primary Examiner* — Anthony D Barfield
(74) *Attorney, Agent, or Firm* — Barnes & Thornburg LLP

(57) ABSTRACT

A seat suspension with suspension strands which comprises a fan grille of plastic provided with anchoring points overmolded on at least some of the suspension strands.

14 Claims, 4 Drawing Sheets

SEAT SUSPENSION WITH OVERMOLDED FAN GRILLE

PRIORITY CLAIM

This application claims priority to French Application No. FR 19 04482, filed Apr. 26, 2019, which is expressly incorporated by reference herein.

BACKGROUND

The present disclosure is in the field of seats such as car seats provided with a ventilation device. The present application relates to a seat suspension equipped with a fan grille overmolded on the suspension.

SUMMARY

According to the present disclosure, a seat suspension with suspension strands which comprises a fan grille of plastic provided with anchoring points overmolded on at least some of the suspension strands.

In illustrative embodiments, the fan grille may include an attachment frame for fastening a fan provided with housings for receiving studs for fastening the fan.

In illustrative embodiments, the suspension strands are connected together by plastic connecting members provided with coupling areas overmolded on the strands, at least some of the plastic connecting members issuing from anchoring points of the grille.

In illustrative embodiments, certain plastic connecting members are shaped as support plates for supplemental equipment and provided with anchoring points overmolded on at least some of the suspension strands.

In illustrative embodiments, the plastic members form a flexible frame for connecting the suspension strands, the fan grille being suspended in a central portion of the flexible frame.

In illustrative embodiments, a fan is fixed under the grille by means of studs of the SILENTBLOCS® type, an annular foam gasket for sealing and for vibration reduction possibly being placed between the grille and the fan.

In illustrative embodiments, a seat comprising a suspension integrated into the seating portion of the seat, wherein the ends of the suspension strands are curved and form attachment fingers for fixing the suspension in a frame of the seat, the fingers being covered with overmolded plastic bridge pieces or sleeves.

In illustrative embodiments, a method for manufacturing a seat suspension with metal suspension strands, which comprises:

a step of positioning the suspension strands in a plastic injection mold comprising recesses for the strands and a mold cavity for forming at least one fan grille, its anchoring points at some of the suspension strands, and tabs;

a step of closing the mold and a step of injecting plastic material into the mold so as to form the fan grille provided with anchoring points on at least some of the suspension strands;

a step of opening the mold and removing the suspension from the mold.

In illustrative embodiments, the injection step may further comprise the injection of plastic connecting members connecting the suspension strands and provided with coupling areas overmolded on the suspension strands.

In illustrative embodiments, the method may include, after exiting the mold, a step of mounting a fan under the grille integral with the suspension strands, by means of studs of the SILENTBLOCS® type, which creates a complete ventilation suspension module. The mounting of the fan may be done later, however.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

The drawings and description below serve to provide a better understanding of the present disclosure, but also contribute to its definition where appropriate.

Figure 1:
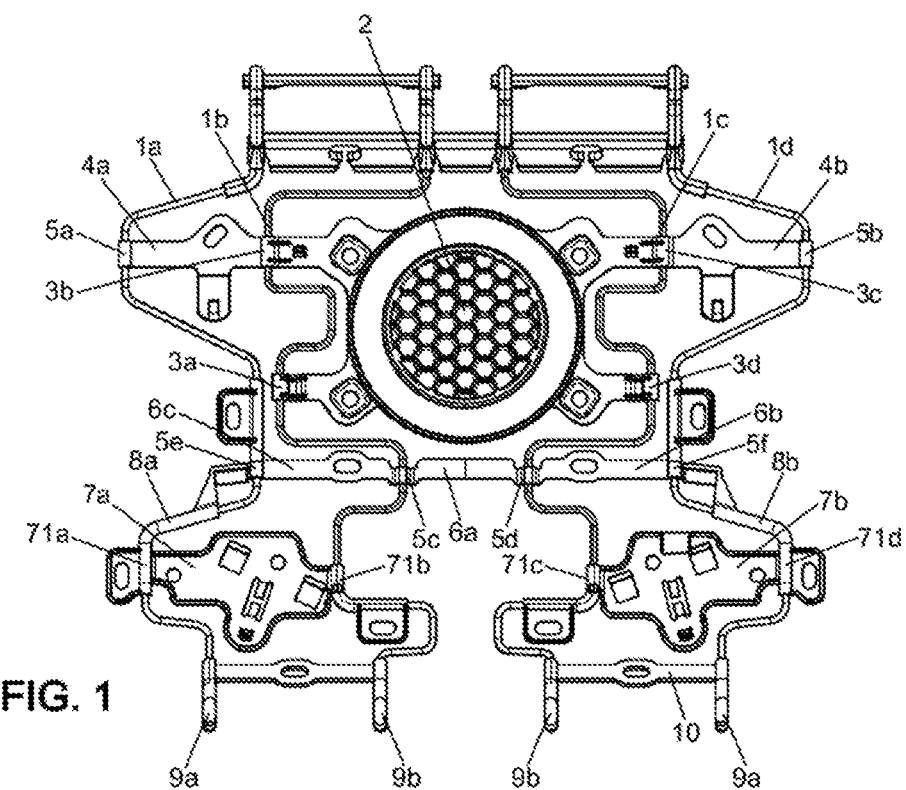
FIG. 1 shows a top view of a suspension provided with an overmolded fan grille.

According to FIG. 1, a suspension of the present disclosure comprises suspension strands 1a, 1b, 1c, 1d. These suspension strands are generally wire springs having a serpentine shape giving them a certain resiliency for suspending a seating portion of a seat.

The suspension of the present disclosure further includes a fan grille 2. Here, this grille is provided with anchoring points 3a, 3b, 3c, 3d on the two central strands of the suspension.

The grille is created by molding in a mold in which the suspension strands are arranged. When molding the grille, the anchoring points 3a to 3d are directly overmolded on certain strands of the suspension, here strands 1b, 1c having a serpentine shape forming an unobstructed area at the center of the suspension to accommodate the grille between the strands. This embodiment has the advantages of reducing the size of the fan under the seat, facilitating its integration, and making it possible to suspend it so that it remains close to the foam of the seating portion of the seat regardless of its installation depth, thus improving ventilation efficiency.

In this example, the anchoring points are extended by plastic tabs 4a, 4b which end in additional anchoring points 5a, 5b on the outer strands of the suspension, such that the molding creates, in addition to the grille suspension, a device that connects all the suspension strands together.

According to this example, other elements are overmolded on the grille. In particular, additional retaining tabs 6a, 6b, 6c connected by anchoring points 5c, 5d, 5e, 5f overmolded on the strands and terminated by overmolded sleeves 8a, 8b which secure the strands. These additional retaining tabs are further connected to plates 7a, 7b for receiving wiring harnesses, connectors, or other seat equipment, these plates also being provided with anchoring points 71a, 71b, 71c, 71d on the strands.

Figure 3:
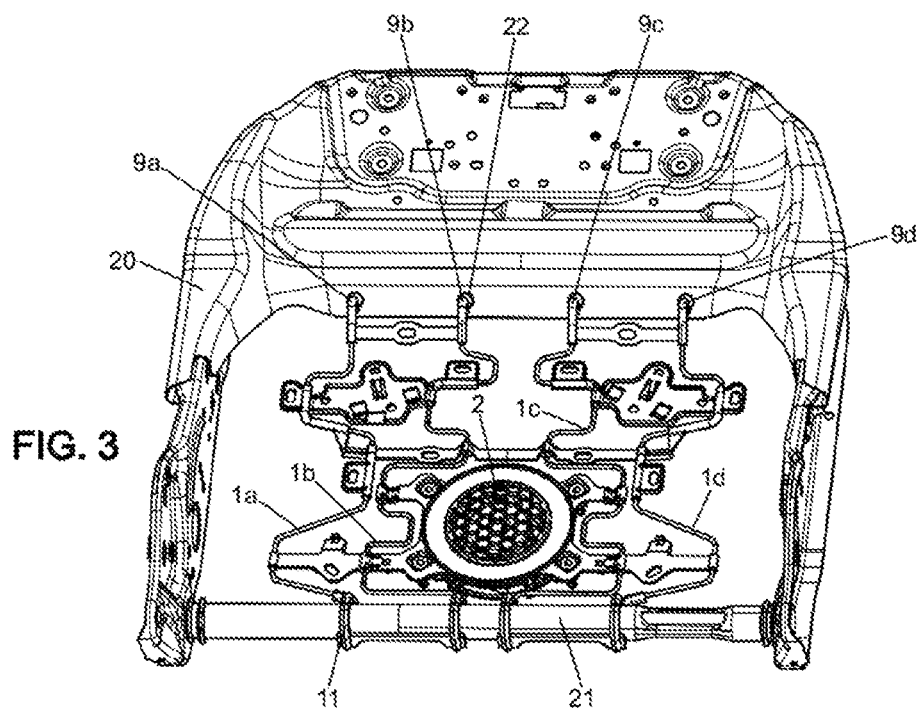
FIG. 3 shows a perspective view from above of the suspension of FIG. 1 in a frame of a seating portion of a seat.

Furthermore, according to the example shown in FIG. 3, first ends of the strands 9a, 9b form attachment fingers for fixing the suspension in holes 22 of a frame 20 and are covered by plastic sleeves which are also overmolded and connected by tabs 10. The plastic sleeves prevent metal-to-metal friction at the grille attachments.

The second ends of the strands are shaped as hooks 11. This allows the suspension to be fixed to a crosspiece 21 of the frame. These second ends of the strands are also covered with overmolded sleeves.

Of course, other molding configurations are possible in which the suspension strand retaining tabs coming from the grille anchoring points are more numerous and/or are connected to equipment support plates.

Figure 2:
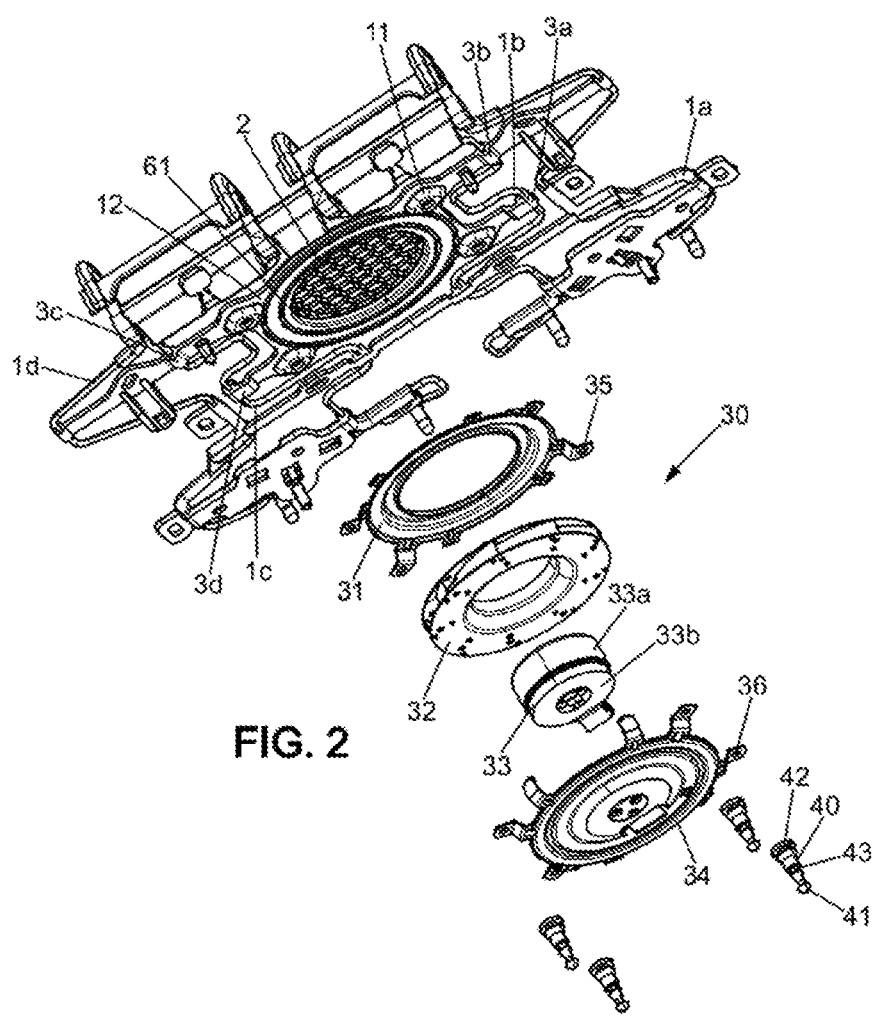
FIG. 2 shows an exploded perspective view from below of a suspension with an overmolded grille and its fan.

FIG. 2 shows the mounting of a fan received under the suspension.

The fan of the example comprises two half-shells 31, 34 which contain a motor 33 and a set of blades 32 mounted on the rotor 33a of the motor. The stator of the motor is held by a support part 33b screwed onto a lower half-shell 34.

To fix the fan on the grille, studs 40 of the SILENTBLOCS® type made of an elastomer type of elastic material are provided with feet 42 inserted into housings 11 created on a frame 12 around the grille. The housings and the frame advantageously form part of the molded part constituting the grille. On the end opposite their feet, the studs have a head 41 which forcibly passes through holes made in tongues 35, 36 of the half-shells. The edge of the holes of the tongues 35, 36 are then retained in annular grooves 43 of the studs.

To achieve a seal between the fan and the grille, an annular foam gasket 61 is arranged between the upper half-shell 31 and the grille.

Figure 4:
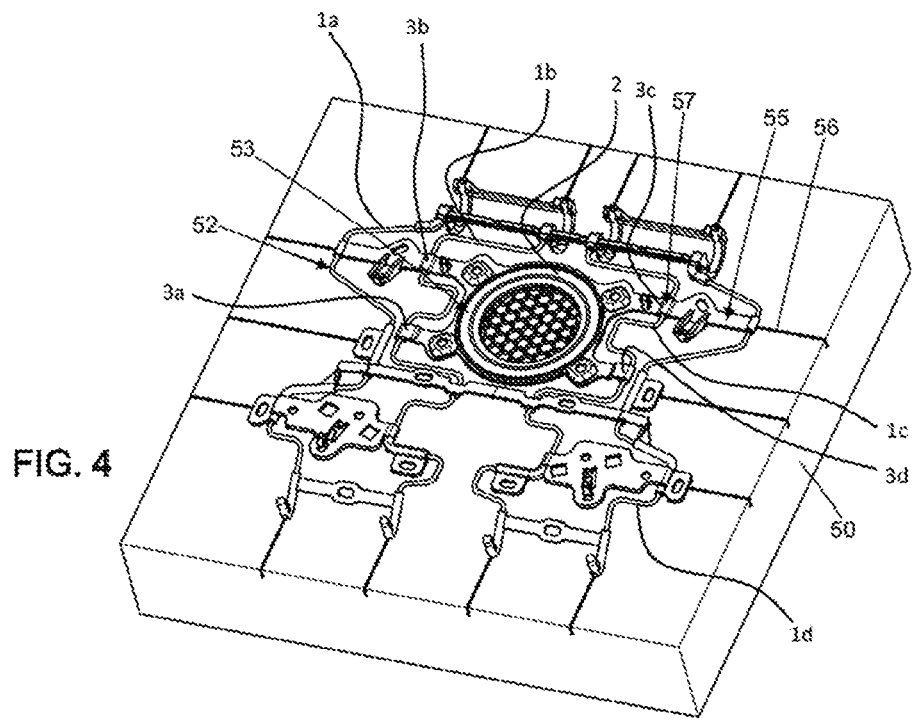
FIG. 4 schematically shows an injection half-mold suitable for the present disclosure.

The method for creating the seat suspension comprises a step of positioning the suspension strands in a plastic injection mold comprising cavities in half-molds 50 of which an example is schematically represented in FIG. 4 with the grille and the strands in position after molding and before ejection. The half-mold is recessed to house the strands 1a, 1b, 1c, 1d as shown and to create at least one fan grille 2 and its anchoring points 3a, 3b, 3c, 3d at some of the suspension strands 1b, 1c. According to the example, the half-molds comprise channels 56 for supplying molten material as is known in the field, recesses 52 for the strands, and the cavity 53 for the grille extended by the cavities 54 for the anchorages and the cavities 55 for the connecting members. Once the strands are positioned in the cavity, the method comprises a step of closing the mold and a step of injecting plastic material into the mold to form the fan grille and its anchoring points on at least some of the suspension strands;

The method then includes a step of opening the mold and removing the suspension from the mold.

This makes it possible to directly create a suspension assembly equipped with a fan grille as output from the molding and with devices for holding the strands together. As a result, the creation of a ventilated seat is simplified, the positioning of the fan being fully controlled.

In the example, the injection step further comprises the injection of plastic connecting members connecting the suspension strands, these plastic connecting members being provided with coupling areas overmolded on the suspension strands.

A sub-assembly ready for mounting the fan is thus produced.

The method may be directly followed by mounting the fan under the grille using studs of the SILENTBLOCS® type; this mounting may also be postponed to a later stage after temporarily storing the suspensions for example.

The present disclosure is not limited to the example shown, and in particular the grille may comprise more than four strands, just as the grille anchoring points may be more numerous depending on the size and weight of the fan to be installed.

In comparative seats, seat suspensions in the form of a seat cushion support of strands forming springs made in particular of metal may be used. The strands may have a serpentine shape, for example sinusoid, crenellation, zigzag, Greek key, or similar, giving resiliency to the strands. The layer of resilient strands is attached to a frame of the seating portion and/or of the backrest, directly or by means of a peripheral framework or rod joined to the strands of the layer.

Equipment such as fans or connector supports may be integrated under the cushion. The integration of such equipment may be difficult to achieve. The present disclosure improves this situation.

The invention claimed is:

1. A seat suspension comprising a plurality of suspension strands and a fan grille made of plastic provided with anchoring points overmolded on first suspension strands of the plurality of suspension strands, wherein the first suspension strands are connected with second suspension strands of the plurality of suspension strands by first plastic connecting members coming from the anchoring points of the grille, the first plastic connecting members being provided with coupling areas with the second suspension strands overmolded on the second suspension strands.

2. The seat suspension of claim 1, wherein the fan grille comprises an attachment frame for fastening a fan provided with housings for receiving studs for fastening the fan.

3. The seat suspension of claim 2, further comprising a fan fixed under the grille by the studs, an annular foam gasket for sealing and for vibration reduction being placed between the grille and the fan.

4. The seat suspension of claim 1, wherein at least some suspension strands of the plurality of suspension strands are connected together by second plastic connecting members provided with coupling areas overmolded on at least some of the suspension strands and wherein at least some of the second plastic connecting members are not connected with the anchoring points of the grille.

5. The seat suspension of claim 4, wherein one or more of the first connecting members and second plastic connecting members are shaped as support plates for supplemental equipment and provided with anchoring points for the supplemental equipment overmolded on at least some of the plurality of suspension strands.

6. The seat suspension of claim 4, wherein the first plastic connecting members and the second plastic connecting members form a flexible frame for connecting the plurality of suspension strands, the fan grille being suspended in a central portion of the flexible frame.

7. A seat comprising a plurality of suspension strands and comprising a fan grille made of plastic provided with anchoring points overmolded on first suspension strands of the plurality of suspension strands, wherein the first suspension strands are connected with second suspension strands of the plurality of suspension strands by first plastic connecting members coming from the anchoring points of the grille, the first plastic connecting members being provided with coupling areas with the second suspension strands overmolded on the second suspension strands, the first and second suspension strands being integrated into the seating portion of the seat, wherein the ends of the plurality of suspension strands are curved and form attachment fingers for fixing the first and second suspension strands in a frame of the seat, the fingers being covered with overmolded plastic bridge pieces or sleeves.

8. The seat of claim 7, wherein the fan grille comprises an attachment frame for fastening a fan provided with housings for receiving studs for fastening the fan.

9. The seat of claim 8, comprising a fan fixed under the grille by means of the studs, an annular foam gasket for sealing and for vibration reduction being placed between the grille and the fan.

10. The seat of claim 7, wherein at least some suspension strands of the plurality of suspension strands are connected together by second plastic connecting members provided with coupling areas overmolded on the at least some of the suspension strands and wherein at least some of the second plastic connecting members are not connected with the anchoring points of the grille.

11. The seat of claim 10, wherein one or more of the first plastic connecting members and the second plastic connecting members are shaped as support plates for supplemental equipment and provided with anchoring points for the supplemental equipment overmolded on at least some of the plurality of suspension strands.

12. The seat of claim 10, wherein the first plastic connecting members and the second plastic connecting members form a flexible frame for connecting the suspension strands, the fan grille being suspended in a central portion of the flexible frame.

13. A method for manufacturing a seat suspension with metal suspension strands, comprising:
    positioning the suspension strands in a plastic injection mold comprising recesses for the strands and a mold cavity for forming: at least one fan grille, its anchoring points at some of the suspension strands, and tabs;
    closing the mold and injecting plastic material into the mold so as to form the fan grille provided with anchoring points on at least some of the suspension strands; and
    opening the mold and removing the suspension from the mold,
    wherein the suspension strands includes first suspension strands and second suspension strands, and wherein the first suspension strands are connected with the second suspension strands by first plastic connecting members coming from the anchoring points of the fan grille, the first plastic connecting members being provided with coupling areas with the second suspension strands overmolded on the second suspension strands.

14. The method of claim 13, comprising a step of mounting a fan under the grille by means of studs.

* * * * *